United States Patent [19]

Gladrow et al.

[11] 4,308,129
[45] Dec. 29, 1981

[54] OCTANE IMPROVEMENT CRACKING CATALYST

[75] Inventors: Elroy M. Gladrow; William E. Winter; William L. Schuette, all of Baton Rouge, La.

[73] Assignee: Exxon Research & Engineering Co., Florham Park, N.J.

[21] Appl. No.: 206,085

[22] Filed: Nov. 12, 1980

Related U.S. Application Data

[60] Division of Ser. No. 80,146, Sep. 28, 1979, Pat. No. 4,259,212, which is a continuation-in-part of Ser. No. 913,480, Jun. 7, 1978, abandoned.

[51] Int. Cl.³ .............................................. C10G 11/05
[52] U.S. Cl. ...................................................... 208/120
[58] Field of Search ......................................... 208/120

[56] References Cited
U.S. PATENT DOCUMENTS

| | | | |
|---|---|---|---|
| 3,293,192 | 12/1966 | Maher et al. | 252/430 |
| 3,312,615 | 4/1967 | Cramer et al. | 208/120 |
| 3,425,956 | 2/1969 | Baker et al. | 252/455 Z |
| 3,542,670 | 11/1970 | Erickson et al. | 208/120 |
| 3,617,509 | 11/1971 | Hensley | 252/455 Z |
| 3,622,501 | 11/1971 | Bertolacini et al. | 252/455 Z |
| 3,711,422 | 1/1973 | Johnson et al. | 252/414 |
| 3,717,587 | 2/1973 | Hepner | 208/120 X |
| 3,788,977 | 1/1974 | Dolbear et al. | 208/120 |
| 3,816,342 | 6/1974 | Plank et al. | 208/120 X |
| 3,930,987 | 1/1976 | Grand | 208/120 X |

*Primary Examiner*—Delbert E. Gantz
*Assistant Examiner*—G. E. Schmitkons
*Attorney, Agent, or Firm*—Roy J. Ott; Edward H. Mazer

[57] ABSTRACT

A cracking catalyst comprising discrete particles of ultra-stable Y-type zeolite and discrete particles of alumina, which particles are dispersed in a porous oxide matrix to produce a catalyst containing 5–40 wt. % ultra-stable Y-type zeolite, 5–40 wt. % alumina and 40–90 wt. % of porous oxide matrix. The cracking catalyst has unusually high activity and selectivity for the production of high octane gasoline fractions from higher boiling point feedstocks.

11 Claims, 1 Drawing Figure

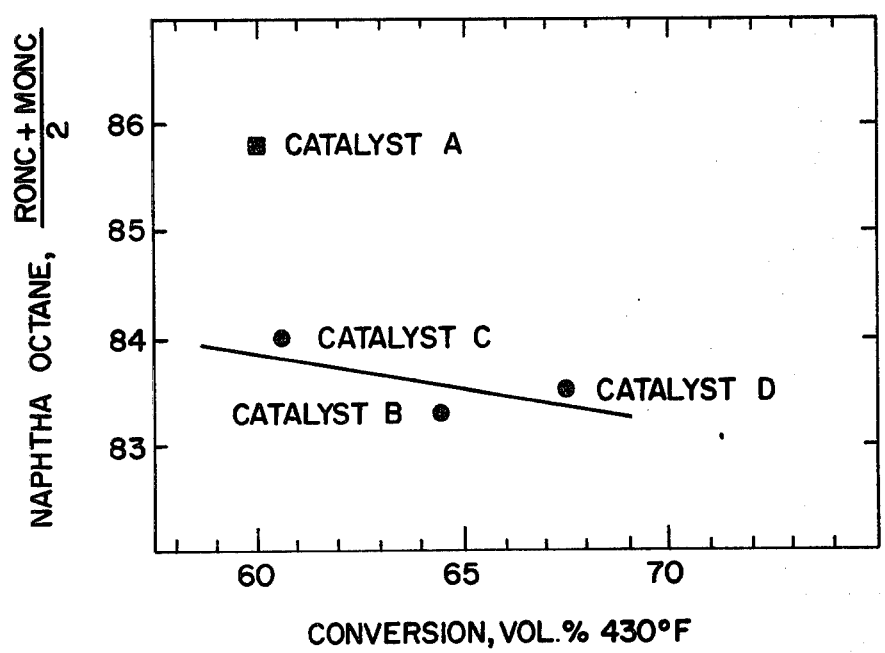

OCTANE IMPROVEMENT CRACKING CATALYST

CROSS-REFERENCE TO RELATED APPLICATIONS

This is a division of application Ser. No. 80,146 filed Sept. 28, 1979 (now U.S. Pat. No. 4,259,212) which is a continuation-in-part of Ser. No. 913,480 filed June 7, 1978, and now abandoned.

BACKGROUND OF THE INVENTION

1. Field of the Invention

This invention relates to a catalyst composition and its use in catalytic cracking processes. More particularly, the invention is concerned with a fluid cracking catalyst which has improved activity and selectivity for producing high octane gasoline fractions from petroleum gas oil feedstocks.

2. Description of the Prior Art

As is well known, the catalytic cracking of heavy petroleum fractions is one of the major refining operations employed in the conversion of crude petroleum oils to desirable fuel products such as heating oils and high octane gasoline. Illustrative of "fluid" catalytic conversion processes is the fluid catalytic cracking process wherein suitably preheated high molecular weight hydrocarbon liquids and vapors are contacted with hot, finely-divided, solid catalyst particles, either in a fluidized bed reactor or in an elongated riser reactor, and maintained at an elevated temperature in a fluidized or dispersed state for a period of time sufficient to effect the desired degree of cracking to lower molecular weight hydrocarbons suitable as gasoline fractions.

A wide variety of petroleum cracking catalysts are described in the literature and are commercially available for use in fluidized cracking processes. Commercial cracking catalysts currently in use generally comprise a crystalline aluminosilicate zeolite cracking component in combination with an inorganic oxide matric component. Typical zeolites combined with the inorganic oxide matrix include hydrogen and/or rare earth metal-exchanged synthetic faujasite of the X or Y-type. The matrix materials generally include amorphous silica-alumina gel and/or a clay material such as, for example, kaolin.

Cracking catalysts which are commercially used for the production of gasoline must exhibit good activity and selectivity. The activity of a catalyst is generally referred to as the ability of the catalyst to convert heavy petroleum fractions to lower molecular weight fractions. Under a given set of operating conditions, the degree to which the catalyst converts the feed to lower molecular weight materials is a measure of the catalyst activity. Thus two or more catalysts can have their activities compared by the level of cracked products made by each catalyst under the same process conditions. The selectivity of a catalyst refers to the fraction of the cracked products in a particular boiling or molecular weight range; e.g., $C_5/430°$ F. naphtha, $C_3^-$ dry gas, carbon, etc. A more special measure of selectivity is the octane rating of the $C_5/430°$ F. naphtha hereafter referred to as octane producibility. Hence it is most desirable for a preferred cracking catalyst to exhibit both high cracking activity, a high selectivity to gasoline ($C_5/430°$ F.) boiling range material, and of high octane number producibility, that is the ability to produce gasoline boiling range material with a high octane rating. Unfortunately, catalysts having the highest activity do not produce the highest octane naphtha products and vice versa. As an example, the amorphous silica-alumina cracking catalyst used prior to the advent of the present day zeolite cracking catalyst is less active than the present day zeolite cracking catalysts for cracking the gas oil feedstock, is less selective in the yield of $C_5/430°$ F. naphtha, but produces a higher octane number naphtha than conventional zeolite cracking catalysts.

The individual components of the catalyst composition of this invention are described in the literature. The specific combination of the components of the invention to produce a highly active and selective catalyst for the production of high octane gasoline is not believed to be shown in the prior art. For example, U.S. Pat. No. 3,312,615 describes a three component catalyst system comprising a crystalline aluminosilicate, substantially inert fines and an inorganic oxide matrix therefor. The crystalline aluminosilicate includes a wide variety of zeolites such as zeolites X, Y, A, L, D, R, S, T, Z, E, F, Q, B, ZK-4, ZK-5 as well as naturally occurring zeolites including chabazite, faujasite, mordenite, and the like. The substantially inert fines include alpha-alumina, barytes, zircon, zirconia, kyanite, and rutile fines.

U.S. Pat. No. 3,542,670 describes a cracking catalyst made by combining a silica-alumina hydrogel with a boehmite amorphous hydrous alumina, and a crystalline aluminosilicate having pores in the 8–15 Å range and a silica-to-alumina mol ratio greater than 3:1. The crystalline aluminosilicate includes a variety of zeolites which are exchanged with various ions including hydrogen, and nonpoisoning metals such as rare earth metals.

U.S. Pat. No. 3,816,342 is directed to a process for preparing a fluid catalytic cracking catalyst containing a highly active crystalline aluminosilicate and a relatively less active matrix material. The patentee claims the crystalline aluminosilicate materials having the general formula:

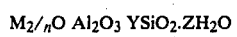

$$M_{2/n}O\ Al_2O_3\ YSiO_2.ZH_2O$$

in the salt form, wherein n is the valence of the metal cation M, Y is the number of moles of silica, and $ZH_2O$ is the water of hydration. Zeolites Y and X are described as being among the most suitable synthetic crystalline aluminosilicates. The matrix materials are described as inorganic oxide gels, such as those of silica-zirconia, alumina, magnesia, and combinations thereof with one another, clays, alumina, metals and refractory materials.

U.S. Pat. No. 3,930,987 describes a cracking catalyst comprising a composite of crystalline aluminosilicates containing rare earth metal cations dispersed in an inorganic oxide matrix wherein at least 50 wt. % of the inorganic oxide is silica and/or alumina. The matrix preferably is made up of silica-alumina, silica-zirconia or silica-zirconia alumina, desirably along with a weighting agent preferably clay and/or alumina. Alpha alumina is preferred in the event alumina is employed.

U.S. Pat. No. 3,717,587 describes the preparation of a cracking catalyst composition containing a wide variety of crystalline aluminosilicates dispersed in an inorganic oxide gel matrix containing a weighting agent. The patent specifies that the most preferred weighting agent is kaolin clay. Other suitable weighting agents include zirconia, alpha alumina, mullite, alumina monohydrate, alumina trihydrate, halloysite, sand, metals such as aluminum and titanium, etc.

U.S. Pat. No. 3,788,977 relates to a cracking catalyst for increasing the amount of aromatic gasoline fractions from gas oil feedstocks. The cracking catalyst is described as a composition comprising a number of zeolite components in combination with minor amounts of a reforminglike additive which consists of uranium oxide and/or platinum metal impregnated upon an inorganic oxide support. The zeolites contemplated by patentee include hydrogen and/or rare earth metal exchanged synthetic faujasites which have silica to alumina ratios on the order of 2.5 up to about 6, including type X or Y faujasites. In addition to rare earth metal exchanged faujasites, patentee contemplates the use of low soda content zeolites.

SUMMARY OF THE INVENTION

A cracking catalyst which has improved activity and selectivity for the conversion of hydrocarbon feedstocks to high octane gasoline fractions, which comprises (a) the ultra-stable variety of Y zeolite, (b) alumina, and (c) an inorganic porous oxide matrix material.

DETAILED DESCRIPTION OF THE INVENTION

The zeolite component of the catalyst of the invention comprises a crystalline aluminosilicate zeolite which is commonly known as "stabilized" or "ultra-stable" Y-type faujasite. These types of zeolites are well known. They are described, for example, in U.S. Pat. Nos. 3,293,192 and 3,402,996 and the publication, Society of Chemical Engineering (London) Monograph Molecular Sieves, pp. 186 (1968) by C. V. McDaniel and P. K. Maher, all of which are incorporated herein by express reference thereto. As used herein, "ultrastable" refers to a Y zeolite which is highly resistant to degradation of crystallinity by high temperatures and steam treatment and is characterized by an $R_2O$ content (where R is Na, K, or any other alkali metal ion) of less than about 4 weight %, preferably less than 1 weight %, and a unit cell size less than about 24.50 Angstrom units (Å) and a $SiO_2/Al_2O_3$ mol ratio in the range of 3.5–7 or higher. In a preferred embodiment of the invention, the unit cell size of the ultra-stable Y zeolite will be less than 24.40 Å. The ultra-stable form of the Y zeolite is obtained primarily by the substantial reduction of the alkali metal ion content and the unit cell size reduction subsequent to the alkali metal removal steps. In other words, the ultra-stable zeolite is identified both by the smaller unit cell and the low alkali metal content in the crystal structure.

The ultra-stable form of the Y zeolite can be prepared, for example, by successively base-exchanging a Y zeolite, i.e., Y-type faujasite, with an aqueous solution of an ammonium salt, such as ammonium nitrate, until the alkali metal content of the Y zeolite is reduced to less than about 4 wt. % $R_2O$ (where R refers to an alkali metal such as sodium). The base-exchanged zeolite is then calcined at a temperature of 1000° F. to 1500° F. over a period of time ranging, for example, from 0.5 to 5 hours, to produce an ultra-stable Y zeolite. If desired, steam may be added to the system during calcination. Preferably, the ultra-stable Y zeolite is thereafter again successively base-exchanged with an aqueous solution of an ammonium salt until the alkali metal content is reduced to less than 1 wt. % $R_2O$. More preferably, the ultra-stable Y zeolite is then again calcined at a temperature of 1000° to 1500° F. with added steam, if desired, to produce an ultra-stable Y zeolite having a unit cell size less than about 24.40 Å. This sequence of ion exchange and heat treatment results in the substantial reduction of the alkali metal content of the original zeolite and results in unit cell shrinkage which are believed to lead to the ultra high stability of the resultant Y zeolite. The particle size of these zeolites is usually in the range 0.1–10 microns, more typically in the range 0.5–3 microns.

In a preferred embodiment, the ultra-stable Y-type zeolite component of the invention will be substantially free of rare earth metals such as, for example, cerium, lanthanum, praseodymium, neodymium, promethium, samarium, europium, gadolinium, terbium, dysprosium, holmium, erbium, yttrium, thulium, scandium, lutecium and mixtures thereof. By substantially free is meant that the rare earth metal content of the zeolite will be less than about 1 wt. % as metal oxide based on weight of the metal exchanged zeolite. Similarly, up to about 1 wt. % of other metal ions such as magnesium or calcium may be base exchanged into the zeolite.

The alumina component of the catalyst of the invention comprises discrete particles of various aluminas which are known and, in many instances, commercially available. These aluminas include the anhydrous and/or the hydrated forms. A rather comprehensive description of aluminas is given in "Encyclopedia of Chemical Technology," Kirk-Othmer, Second Edition, Volume 2 (Interscience Publishers) at pages 41–55 which is incorporated herein by reference.

Among the aluminas useful in preparing the catalyst of this invention are discrete alumina particles having a total surface area (B.E.T. method-Brunauer, Emmett and Teller; The Van Nostrand Chemist's Dictionary (1953 Edition)) greater than 20 square meters per gram ($m^2/g$.), preferably greater than 145 $m^2/g$., for example, 145–300 $m^2/g$. Preferably the pore volume (B.E.T. method) of the alumina will be greater than 0.35 cc/g. The average particle size of the alumina will generally be less than 10 microns, more preferably less than 3 microns. These discrete alumina particles used in preparing the catalyst are sometimes designated as "bulk" alumina. The term "bulk" is intended herein to designate an alumina which has been preformed and placed in a physical form such that its surface area and pore structure is stabilized so that when it is added to an impure inorganic gel containing considerable amounts of residual soluble salts, the salts will not alter the surface and pore characteristics measurably nor will they promote more than minimal chemical attack on the preformed alumina which could then undergo change. For example, addition of "bulk" alumina will mean a material which has been formed by suitable chemical reaction, the slurry aged, filtered, dried, washed free of residual salts and then dried to reduce its volatile contents to less than about 25 wt. %.

In addition to the above described bulk, porous, preformed aluminas, it is also envisioned to prepare the catalyst by using hydrous slurries of diverse hydrated aluminas which may be a particular crystalline form, or amorphous or mixtures. These hydrates include alpha-monohydrate, alpha-trihydrate, beta-trihydrate, and to a lesser degree, beta-monohydrate forms of alumina. These are generally made from solutions of aluminum salts or of alkaline aluminates. Depending on reaction conditions, the product aluminas can have a wide range of physical properties. In addition to the foregoing, the alumina slurry can be a gel. Alumina gels generally have a dried solids content of about 2-12% by weight. On drying, the alumina gels lose water progressively and with increasing temperatures the first transition phase (non-hydrated) can be either eta- or gamma-alumina.

The presence of discrete particles of crystalline alumina in the catalyst of this invention can be observed by X-ray diffraction in accordance with well known techniques such as described in Advances in X-ray Diffractometry and X-ray Spectrography edited by William Parrish (1962), Centrex Publishing Company-Eindhoven.

The inorganic porous oxide which is used as the matrix in the catalyst composition of the invention may include any of the readily available porous materials such as alumina, silica, boria, chromia, magnesia, zirconia, titania, silica-alumina, and the like, and mixtures thereof. These materials may also include one or more of the various well known clays such as montmorillonite, kaolin, halloysite, bentonite, and the like. Preferably, the inorganic porous oxide will be one or more of the conventional siliceous varieties containing a major amount of silica and a minor amount of an oxide of at least one metal in Groups II-A, III-A and IV-B of the Periodic Table (Handbook of Chemistry and Physics, 38th Ed., 1957). Representative silica-containing matrix materials include silica-alumina, silica-magnesia, silica-zirconia, silica-thoria, silica-titania, silica-alumina-zirconia, silica-alumina-magnesia, etc.

In a more preferred embodiment of the invention, the inorganic porous oxide matrix material will be an amorphous silica-alumina gel. As is generally known, these materials are typically prepared from silica hydrogel or hydrosol, which is mixed with an alumina source, generally an aluminum salt solution, to secure the desired silica-alumina composition. The alumina content of the silica-alumina matrix will typically range from about 5 to 40 wt. % with the preferred composition having an alumina content of about 10 to 35 wt. %. Various procedures are described in the literature for making silica-alumina, e.g., U.S. Pat. Nos. 2,908,635 and 2,844,523.

The catalyst composition of the invention will comprise 5-40 wt. %, preferably 10-30 wt. %, of the aforedescribed ultra-stable Y zeolite; 5-40 wt. %, preferably 10-30 wt. %, of alumina; and 40-90 wt. %, preferably 50-80 wt. %, of the porous oxide matrix. It is also within the scope of this invention to incorporate in the catalyst other materials commonly employed in cracking catalysts such as various zeolites, clays, metal CO oxidation promoters, etc.

In a preferred embodiment, the catalyst of the invention will have the ratio $$\frac{\text{Weight \% Na}_2\text{O on total catalyst}}{\text{Weight \% zeolite in total catalyst}}$$

equal to or less than 0.013.

The catalysts of the present invention may be prepared in accordance with well known techniques. For example, a preferred method of preparing a catalyst of the invention is to react sodium silicate with a solution of aluminum sulfate to form a silica-alumina hydrogel slurry which is then aged under controlled conditions to give the desired pore properties, filtered to remove a considerable amount of the extraneous and undesired sodium and sulfate ions and then reslurried in water. Separately, a bulk alumina is made, for example, by reacting solutions of sodium aluminate and aluminum sulfate, under suitable conditions, aging the slurry to give the desired pore properties of the alumina, filtering, drying, reslurrying in water to remove sodium and sulfate ions and drying to reduce volatile matter content to less than 25 weight percent. The alumina is then slurried in water and blended, in proper amount, with the slurry of impure silica-alumina hydrogel.

The ultra-stable Y zeolite of the invention may then be added to this blend, with a sufficient amount of each component of the catalyst being utilized to give the desired final composition. If desired, the resulting mixture is filtered to remove a portion of the remaining extraneous soluble salts therefrom and to reduce the amount of liquid present in the slurry. The filtered mixture is then dried to produce dried solids. The dried solids are subsequently reslurried in water and washed substantially free of the undesired soluble salts using a pH controlled ammonium sulfate solution followed by a water rinse. The catalyst may then be dried to a residual water content of less than about 15 wt. %. Other methods for compositing the components of the invention are known to those skilled in the art and are meant to be included within the scope of this invention.

The feedstock suitable for conversion in accordance with the invention include any of the well known feeds conventionally employed in catalytic cracking processes. Usually, they will be petroleum derived, although other sources such as shale oil, tar sands oil, and coal are not to be excluded. Typical of such feeds are heavy and light virgin gas oils, heavy and light virgin naphthas, solvent extracted gas oils, coker gas oils, steam-cracked gas oils, cycle oils, residua, deasphalted residua, hydrotreated residua, topped crudes, etc., and mixtures thereof.

The catalyst of the invention may be employed for the catalytic cracking of the aforementioned feedstock in accordance with well known techniques. In general, the cracking conditions will include a temperature in the range of about 850° to 1050° F., a pressure of 0 to 50 psig. and a feed rate of 1 to 200 W/Hr/W. The catalyst may be regenerated at conditions which include a temperature in the range of 1100° to 1500° F., preferably 1175° to 1350° F.

BRIEF DESCRIPTION OF THE DRAWING

The FIGURE is a graph illustrating the activity and selectivity characteristics of various cracking catalysts which are compared and described in detail in the examples hereinafter.

DESCRIPTION OF THE PREFERRED EMBODIMENTS

The following examples further illustrate the present invention. Unless otherwise stated, all percentages refer to weight percentage.

EXAMPLE 1

A catalyst of the invention was prepared as follows:

A dilute sodium silicate solution containing about 50 g. silica/liter was contacted with $CO_2$ to effect gelation, the impure silica hydrosol aged and then blended with a stream of aluminum sulfate. After filtering the impure silica/alumina to remove some of the extraneous soluble salts, the material had a dry solids content of 15.7% and the dry solids analyzed 57.3% $SiO_2$ and 20.2 % $Al_2O_3$.

In a mixing tank, 35 pounds water were blended with 98.75 pounds of the above impure silica/alumina hydrogel. In a second mixing tank, 15 pounds of water were blended with 1824 grams (dry basis) alumina (sold under the trade name Catapal HP grade by Conoco Chemical Division of Continental Oil Company) and then with stirring 1824 grams (dry basis) of low soda content faujasite (sold under the trade name Linde LZ-Y82 grade by Union Carbide Corporation) blended therein. The composite slurry was added to the gel slurry, homogenized by colloid milling twice, and then spray dried.

The impure material was slurried in warm water to about an 18 wt. % solids content and then filtered. The filter cake was treated with a 3 wt. % ammonium sulfate solution brought to a pH of 8 with ammonia and finally rinsed with ammoniated water (about 5 lb. solution per lb. catalyst) to remove residual soluble salts and finally rinsed with water. The resultant catalyst had an $Na_2O$ content of 0.17 wt. % and contained about 20% ultra-stable Y zeolite. 20% $Al_2O_3$ and 60% $(SiO_2/Al_2O_3)$ and is designated "A" in subsequent examples.

EXAMPLE 2

The catalyst of Example 1 was compared in activity and selectivity for the production of high octane cat naphthas with various cracking catalysts designated as "B", "C" and "D" which are commercially available or which are representative of cracking catalysts presently employed in the petroleum industry.

Catalyst "B" is a widely used commercial catalyst and contains about 14–16% faujasite (Y-type), about 28–30% kaolin clay and about 55–60% silica/alumina gel matrix. The total catalyst contains about 2.8–3.5% rare earths (as oxides). Catalyst "C" is a commercial catalyst and consists of about 5% faujasite (Y-type) and about 95% silica/alumina gel. The faujastie in "C" was exchanged with mixed rare earths and calcined before compositing with the matrix gel. Catalyst "C" contains about 1.0–1.2% rare earths (as oxides). Catalyst "D" contains about 8–9% faujasite (Y-type) and about 91–92% silica/alumina gel matrix. It is believed to contain faujastite pre-exchanged with rare earths and calcined before mixing with the matrix. Catalyst "D" analyzes about 1.8–2.2% rare earths (as oxides). Thus the catalysts of comparison in the following example contain from 5–16% faugasite (Y-type), from 1.0–3.5% rare earths (as oxides), and a matrix of silica/alumina gel with or without added bulk kaolin. These catalysts are compared in cracking performance with the catalyst of the invention "A" in Example 3 hereof. Each of these catalyst compared in Example 3 were steamed for 16 hours at 1400° F. and 0 psig. to simulate commercial deactivation before testing.

EXAMPLE 3

Each of the catalysts described in the previous two examples were tested under conditions listed below in a circulating, fluidized bed catalytic cracking unit with reactor and regenerator vessels. The feed used for these experiments is described in Table I. The results of these experiments are listed in Table II.

TABLE I

| Feed | |
|---|---|
| Gravity | 27.5° API |
| Sulfur | .812 wt. % |
| Nitrogen | 618 ppm |
| Conradson Carbon | 0.27 wt. % |
| Aniline Point | 171° F. |
| Distillation Range*, °C. | |
| IBP/5% | 249/263 |
| 10/20% | 276/298 |
| 30/40% | 317/341 |
| 50/60% | 366/382 |
| 70/80% | 416/441 |
| 90/95% | 475/504 |
| FBP | 513 |

*Atmospheric pressure.

TABLE II

| Catalyst | A | B | C | D |
|---|---|---|---|---|
| Pressure, psia. | 14.7 | 14.7 | 14.7 | 14.7 |
| Cracking Temperature, °F. | 925 | 926 | 924 | 918 |
| Weight Hourly Space Velocity | 16.0 | 16.1 | 11.4 | 16.3 |
| Catalyst to Oil Weight Ratio | 3.9 | 4.0 | 4.0 | 4.2 |
| Carbon On Regenerated Catalyst, Wt. % | 0.07 | 0.1 | 0.09 | 0.1 |
| Conversion, Vol. % 430° F. | 60.0 | 64.5 | 60.6 | 67.4 |
| Product Yields & Properties | | | | |
| Dry Gas, $C_3$—, Wt. % | 4.7 | 4.9 | 4.7 | 5.0 |
| Propylene, Wt. % | 3.3 | 3.2 | 3.1 | 3.4 |
| Total $C_4$, Vol. % | 11.2 | 12.3 | 11.5 | 13.6 |
| Butylenes, Vol. % | 6.4 | 6.0 | 5.8 | 6.5 |
| $C_5$/430° F. Naphtha, Vol. % | 53.2 | 57.3 | 54.5 | 59.1 |
| Research Octane Number Clear (RONC) | 91.5 | 88.0 | 89.3 | 88.0 |
| Motor Octane Number Clear (MONC) | 80.0 | 78.6 | 78.7 | 79.0 |
| $\frac{RONC + MONC}{2}$ | 85.8 | 83.3 | 84.0 | 83.5 |
| $C_5$/430° F. Naphtha + Propylene and Butylene Alkylate | 72.8 | 76.0 | 72.6 | 79.2 |
| Coke, wt. % | 1.8 | 2.1 | 1.6 | 2.4 |

The relative activities and octane producibilities of the catalysts tested in this example are shown in the figure wherein octane producibility as measured by ½ (RONC+MONC) is plotted against catalyst activity as measured by volume percent conversion at the same cracking conditions. In general, it is seen from the figure that catalyst octane producibility is greater for state of the art catalyst having lower activity and vice versa. Unexpectedly, however, the catalyst of this invention was found to have much higher octane producibility for its activity than prior art catalysts. At the same time, its selectivity for naphtha as measured by volume percent naphtha as a fraction of 430° F. conversion yield was found to be equivalent to the prior art catalysts. In fact, when the potential alkylate (i.e., propylenes and butylenes yields) produced by all catalysts was considered, the potential gasoline selectivity (cat naphtha plus potential alkylate per unit of conversion) of catalyst A was somewhat better than the state of the art catalysts. This is shown by Table III.

TABLE III

| Catalyst | A | B | C | D |
|---|---|---|---|---|
| C$_5$/430° F. Naphtha Selectivity | .89 | .89 | .90 | .88 |
| C$_5$/430° F. Naphtha + Alkylate Selectivity | 1.21 | 1.18 | 1.20 | 1.18 |

EXAMPLE 4

Another catalyst of this invention was prepared as follows:

(a) 22 pounds of faujasite (sold under the trade name Linde LZ-Y52 grade by Union Carbide Corporation) were slurried into 100 pounds of water at 135° F. In a separate vessel, 9 pounds of ammonium sulfate were dissolved in 50 pounds of water, followed by the additionof 200 cc H$_2$SO$_4$. The acidified ammonium sulfate solution was then added to the faujasite slurry and the mixture heated to 135° F. and stirred for 2 hours. The slurry, which had a pH of 4.5, was then filtered, rinsed with hot water and oven dried at about 225° F. for 16 hours.

(b) The oven dried material from step (a) was placed in shallow trays and heated in a furnace preheated at 1250° F. in an atmosphere of flowing steam. The faujasite was calcined 1 hour at 1250° F. and the furnace cooled at 500° F. in flowing steam before removing. The calcined material had a Na$_2$O content of 5.7% and a unit cell size of 24.62 Å.

(c) The calcined faujasite zeolite from step (b) was re-treated as described above in step (a). After oven drying, the faujasite was calcined 1 hour at 900° F. in ambient air. After cooling, the resultant faujasite had a Na$_2$O content of 2.15% and a unit cell size of 24.50 Å. It is a stabilized low soda content faujasite (zeolite Y).

(d) In a mixing tank, 40 pounds of water were slurried with 80 pounds of impure silica-alumina hydrogel prepared in the manner of Example 1 (11.3% catalytic solids dry basis). In a second mixing tank, 25 pounds of water were slurried with 1850 grams (1360 grams dry basis) of a commercial grade alumina. A portion of the alumina was previously calcined at 1000° F. for 6 hours and had a surface area (BET) of 523 M$^2$/g and a pore volume of 1.08 cc/gram with a pore volume of 0.21 cc/gram in pores having diameters in the range of 90–200 Å. To this alumina slurry were added 1648 (1360 grams dry basis) grams of the calcined stabilized faujasite from step (c) above after ball milling in ambient air. The slurries were combined and then spray dried at about 250° F. The composite material was washed free of extraneous soluble salts, filtered, rinsed and dried as described hereinabove in Example 1. The resultant catalyst contained 0.24% Na$_2$O and comprised about 20% ultra-stable Y zeolite, 20% alumina, and 60% silica-alumina gel. It is designated as catalyst "E" in subsequent examples.

EXAMPLE 5

This example illustrates the preparation of a preferred catalyst of the invention.

(a) A portion of the stabilized zeolite Y from step (c) of Example 4 above was placed in a dish and charged to a furnace at 1000° F. The temperature was raised to 1500° F., held there for 1 hour, and then allowed to cool. The material analyzed 2.15% Na$_2$O and had a unit cell size of 25.38 Å. The heat treatment reduced the cell size from 24.50 Å to 24.38 Å.

(b) 3.0 pounds (dry basis) of the calcined, stabilized faujasite from step (a) of this Example were then slurried in 20 pounds of water. This was followed by the addition of 3.0 pounds (dry basis) of the alumina from Example 4. The mixed slurry was then blended with 9.0 pounds (dry catalytic solids basis) of the impure silica-alumina hydrogel of Example 4, spray dried, and washed free of extraneous soluble salts in the manner of Example 4. The total composite catalyst, designated "F", had a composition of about 20% precalcined ultra-stable Y zeolite, 20% Al$_2$O$_3$, and 60% silica alumina gel. It analyzed 0.23% Na$_2$O and 0.46% sulfate.

EXAMPLE 6

The catalyst of this example is a catalyst of this invention. It was made as follows:

(a) Commercially available stabilized low soda content faujasite (sold under the trade name of Linde LZ-Y82 grade by Union Carbide Corporation) having a dry solids content of 80.3% a soda content of 0.12% as Na$_2$O, a SiO$_2$/Al$_2$O$_3$ mol ratio of 5.5 and a unit cell size of 24.51 Å was ball milled and 3.0 pounds (dry basis) thereof slurried in 20 pounds of water. To this slurry were added 3.0 pounds (dry basis) of the alumina described in Example 4 above.

(b) In a separate mixing tank, 40 pounds of water were slurried with 71.0 pounds of the impure silica-alumina hydrogel described in Example 1 (equivalent to 9.0 lbs. catalytic solids). The slurry prepared in step (a) of this Example was then added with mixing to the slurry of silica-alumina hydrogel. The composite slurry was then colloid milled, spray dried, washed free of extraneous soluble salts, and dried in the manner of Example 1. The catalyst analyzed 0.08% Na$_2$O and 0.11% SO$_4$ and had a composition of about 20% ultra-stable Y zeolite, 20% alumina, and 60% silica-alumina gel. It is designated "G" in subsequent examples.

EXAMPLE 7

The catalyst of this example is another catalyst of the invention. It was made as follows:

(a) The stabilized, low soda content Y zeolite as described in Example 6 above was placed in a dish and charged to a furnace at 1000° F. The temperature was raised to 1500° F. and held for 1 hour and then allowed to cool. The material was discharged from the furnace below 1000° F. This precalcined ultra-stable faujasite had a unit cell size of 24.34 Å compared to 24.51 Å before this calcination step.

(b) In a mixing tank, 40 pounds of water are slurried with 71.0 pounds of the impure silica-alumina hydrogel (equivalent to 9.0 pounds catalytic solids) described in Example 1 above. In a second mixing tank, 20 pounds of water were slurried with 1400 grams of ball milled precalcined faujasite (3.0 pounds dry basis) from step (a) of this Example. To this slurry were added 3.0 pounds (dry basis) of the ball milled alumina of Example 4.

(c) The slurries from step (b) of this Example were combined, colloid milled, spray dried, washed free of extraneous salts, and dried in the manner of Example 1. The resultant catalyst is designated "H" and contains 0.07% Na$_2$O and 0.40% SO$_4$. Catalyst "H" has a composition of 20% precalcined ultra-stable zeolite, Y, 20% alumina and 60% silicaalumina gel.

EXAMPLE 8

Catalyst "B", "E", "F", "G" and "H" were each calcined 6 hours at 1000° F. and then steamed at 1400° F. for 16 hours and 0 psig steam pressure to simulate commercial equilibrium cracking catalyst performance. The catalysts were then each evaluated for cracking performance in a full cycle cracking operation. The unit employed is a circulating, fluidized cat cracking unit with a regenerator and reactor/stripper vessels. The temperatures in the reactor and regenerator were 925° F., and 1105° F., respectively. The feedstock was a 450/1100° F., vacuum gas oil described below in Table IV. The unit was operated at a catalyst to oil weight ratio of 4.0 and a pressure of 0 psig. The results given below in Table V compare the catalysts at constant 70 volume % conversion.

TABLE IV

| Feed | |
|---|---|
| Gravity | 22.9° API |
| Sulfur | 1.245 wt. % |
| Nitrogen | 705 ppm |
| Conradson Carbon | 0.43 wt. % |
| Aniline Point | 183.5° F. |

| Distillation Range*, °C. | |
|---|---|
| IBP/5% | 298/334 |
| 10/20% | 349/378 |
| 30/40% | 395/412 |
| 50/60% | 432/457 |
| 70/80% | 482/499 |
| 90/95% | 523/543 |
| FBP | 565 |

*Atmosphere pressure

TABLE V

| Catalyst | B | E | F | G | H |
|---|---|---|---|---|---|
| Yields: | | | | | |
| $C_5$/430° F., Vol. % | 60.3 | 61.3 | 61.0 | 60.5 | 61.0 |
| $C_4$ Olefins, Vol. % | 6.8 | 7.2 | 8.5 | 8.6 | 7.8 |
| $C_3$ Olefin, Wt. % | 3.7 | 4.1 | 4.1 | 4.2 | 4.3 |
| Coke, Wt. % | 3.50 | 2.80 | 2.90 | 2.80 | 2.90 |
| $C_3$— Dry Gas, Wt. % | 5.8 | 5.8 | 6.1 | 6.1 | 6.4 |
| Total $C_4$, Vol. % | 13.1 | 12.9 | 13.6 | 14.0 | 13.0 |
| $C_5$/430° F. Octanes | | | | | |
| RONC[1] | 90.8 | 93.4 | 94.1 | 93.4 | 94.1 |
| MONC[2] | 79.8 | 80.7 | 81.3 | 80.8 | 81.2 |
| $\frac{\text{RONC} + \text{MONC}}{2}$ | 85.3 | 87.0 | 87.7 | 87.1 | 87.6 |

[1] Research Octane Number Clear
[2] Motor Octane Number Clear

The data show that catalyst E, F, G and H all show significant increases in octane numbers of the cracked naphtha over reference catalyst B. Catalysts F and H of this invention show increased octanes over catalysts E and G, due to the precalcining treatment given the ultra-stable Y zeolite to reduce the unit cell size to 24.38 Å and lower.

EXAMPLE 9

This example describes various cracking catalysts which are hereinafter compared in cracking activity and selectivity with the catalyst of this invention.

Catalyst I

This catalyst is a commercially available silicaalumina amorphous gel catalyst heretofore widely used for the cracking of petroleum feedstocks. Catalyst I consists of about 25% alumina and 75% silica and is amorphous as shown by X-ray diffraction. Catalyst I is made by admixing carbon dioxide under pressure with dilute sodium silicate solution (about 7 wt. % $SiO_2$ content) to effect gelation. The resultant impure silica hydrogel is aged at atmospheric pressure and thereafter admixed with solutions of aluminum sulfate and sodium aluminate to give the desired alumina content and a final pH of 5.0–5.6. The admixture is then filtered to form a filter cake which is apportioned for use in preparing Catalyst I and the catalysts described hereinafter. A portion of the filter cake is reslurried in water, spray dried and then washed free of extraneous soluble salts with dilute (3%) ammonium sulfate solution having a pH of 7.8–8.3. The resultant silicaalumina gel is thereafter rinsed with water, dried and calcined at about 1000° F. for six hours.

Catalyst J

This catalyst contains discrete alumina particles uniformly dispersed in an amorphous silica-alumina gel to give a composition of 20 wt. % alumina particles dispersed in 80 wt. % amorphous silica-alumina gel.

Catalyst J was prepared by the addition of 99 lbs. of the impure silica-alumina hydrogen used in the preparation of catalyst I (equivalent to 12 lbs. of dry catalytic solids) to 25 lbs. of water. In a separate vessel, 3.43 lbs. of ball milled, uncalcined alumina (equivalent to 3.00 lbs. on a dry basis) sold as Grade HP by Continental Oil Company was added to 20 lbs. of water. The resultant alumina slurry was colloid milled and then added to the impure silica-alumina hydrogel slurry. The resultant mixture slurry was then colloid milled to ensure a homogeneous distribution of the discrete alumina particles in the gel. The mixed slurry was thereafter spray dried, washed free of extraneous soluble salts, dried, and calcined as described above in the preparation of Catalyst I.

Catalyst K

This catalyst contains 20 wt. % ultra-stable Y zeolite and 80 wt. % alumina.

Catalyst K was prepared by blending 80 lbs. of water and 13.4 lbs. of uncalcined commercial grade Boehmite-type alumina (equivalent to 12 lbs. alumina dry basis and stabilized with 2.5 wt. % silica) having a surface area of 523 $m^2$/g and a pore volume of 1.08 ml/g. With stirring, 200 cc of nitric acid (4% dosage based on alumina) were added to the alumina slurry, after which stirring was continued for one hour and an additional 100 lbs. of water were added to dilute the slurry. In a separate vessel, 22.2 lbs. of ultra-stable Y zeolite sold as Grade Z-14 by the Davison Division of W. R. Grace & Company were slurried in 100 lbs. of water and combined with 75 lbs. of a pH 4.5 solution containing 13.2 lbs. ammonium sulfate. The combined slurry was then heated to slightly above 180° F., stirred for one hour, filtered, and rinsed with water. This exchange procedure was then repeated to leave a wet filter cake.

A portion of the wet filter cake (equivalent to 3 lbs. ultra-stable Y zeolite dry basis) was slurried in 10 lbs. of water and thereafter blended with the nitric acid peptized alumina slurry described above. The combined slurry was colloid milled and spray dried without subsequent washing since there were no extraneous soluble salts requiring removal.

Catalyst L

This catalyst contains 20 wt. % ultra-stable Y zeolite and 80 wt. % amorphous silica-alumina gel.

Catalyst L was prepared by the addition of 99 lbs. of the impure silica-alumina hydrogel from the preparation of catalyst I (equivalent to 12.0 lbs. dry catalytic solids) to 25 lbs. of water. In a separate vessel, 1666 grams (equivalent to 3.0 lbs. dry basis) of uncalcined ultra-stable Y zeolite sold under the trade name Grade LZ-Y82 by Union Carbide Corporation were added to 20 lbs. of water. The resultant mixture was colloid milled and then combined with the silica-alumina gel slurry to form a composite slurry which was colloid milled, spray dried and washed free of extraneous soluble salts as described above in the preparation of catalyst I. The catalyst was then dried and calcined at about 1000° F. for six hours.

Catalyst M

This catalyst, which is a catalyst of the invention, contains discrete particles of ultra-stable Y zeolite and discrete particles of alumina which are dispersed in an amorphous silica-alumina gel matrix to give a catalyst containing 20 wt. % ultra-stable Y zeolite, 20 wt. % alumina and 60 wt. % amorphous silica-alumina gel.

Catalyst M was prepared by the admixture of 30 lbs. of water with 93 lbs. (equivalent to 9.0 lbs. dry catalytic solids) of the impure silica-alumina filter cake described in the preparation of catalyst I. In a separate vessel, 20 lbs. of water were admixed with 3.74 lbs. (equivalent to 3.0 lbs. dry basis) of the ball milled and uncalcined ultra-stable Y zeolite designated above as LZ-Y82. Thereafter, 4.08 lbs. (equivalent to 3.0 lbs. dry basis) of the ball milled and uncalcined alumina described above in the preparation of catalyst K were added to the slurry containing the ultra-stable Y zeolite. The resultant slurry was colloid milled and combined with the impure silica-alumina slurry to form a composite which was colloid milled, spray dried and washed free of extraneous soluble salts as described above in the preparation of catalyst I. It was calcined at about 1000° F. for six hours.

Catalyst N

This catalyst is substantially the same as catalyst M with the exception that the ultra-stable Y zeolite is replaced with the decationized hydrogen form of Y faujasite.

Catalyst N was prepared by the admixture of 35 lbs. of water and 83 lbs. (equivalent to 9.0 lbs. catalytic solids) of the impure silica-alumina gel wet filter cake described above in the preparation of catalyst I. In a separate vessel were added 20 lbs. of water and 4.42 lbs. (equivalent to 3 lbs. dry basis) sodium faujasite commercially available as Grade LZ-Y52 from Union Carbide Corporation. The resultant slurry was then admixed with 4.08 lbs. (equivalent to 3.0 lbs. dry basis) of the ball milled, uncalcined alumina described above in the preparation of catalyst K. The faujasite-alumina slurry was then colloid milled and combined with the slurry of impure silica-alumina gel to form a composite slurry which was colloid milled, spray dried, reslurried in hot water for 10 minutes, and then filtered. The resultant filter cake was then washed three times to remove extraneous soluble salts as described above in the preparation of catalyst I. Thereafter, the composite catalyst was water rinsed, dried and calcined at about 1000° F. for six hours. The resultant catalyst contained 0.62 wt. % Na and 0.09 wt. % $SO_4$.

EXAMPLE 10

Catalysts I, J, K, L, M and N were each steamed for 16 hours at 1400° F. and atmospheric pressure to simulate commercial equilibrium catalyst activity. The steamed catalysts were then evaluated for cracking activity in the wellknown Micro-activity Test (MAT) which is described, for example, in the Oil and Gas Journal, 1966, Vol. 64, No. 39, at pages 7, 84 and 85; and the November 22, 1971 edition of the Oil and Gas Journal at pages 60–68. The results of these tests are given below in Table VI where Relative Catalyst Activity is defined, using catalysts M as the reference, by the following equation:

$$\text{Relative Catalyst Activity} = \frac{\left[\frac{\% \text{ MAT conversion}}{100 - \% \text{ MAT conversion}}\right]}{\left[\frac{\% \text{ MAT conversion}}{100 - \% \text{ MAT conversion}}\right]_{\text{Catalyst M}}}$$

The ratio % MAT Conversion/[100-% MAT Conversion] given in Table VI, when measured at constant operating conditions, is proportional to catalyst activity for second order kinetic systems such as catalytic cracking.

TABLE VI
COMPARISON OF CATALYST ACTIVITIES

| Catalyst | I | J | K | L | M | N |
|---|---|---|---|---|---|---|
| Composition, Wt. % | | | | | | |
| Ultra-stable Y zeolite | 0 | 0 | 20 | 20 | 20 | 20* |
| $Al_2O_3$ | 0 | 20 | 80 | 0 | 20 | 20 |
| $SiO_2$—$Al_2O_3$ Gel | 100 | 80 | 0 | 80 | 60 | 60 |
| MAT Conversion, % | 46.8 | 45.0 | 64.8 | 59.3 | 67.5 | 58.1 |
| $\frac{\% \text{ MAT Conversion}}{100 - \% \text{ MAT Conversion}}$ | 0.88 | 0.82 | 1.84 | 1.46 | 2.08 | 1.43 |
| Relative Catalyst Activity | 0.42 | 0.39 | 0.88 | 0.70 | 1.0 | 0.69 |

*Zeolite is Y-type faujasite which is not ultra-stable Y zeolite as defined herein Referring to Table VI, it is seen that the catalyst of this invention, catalyst M, is significantly greater in catalytic activity compared to related catalysts falling outside the scope of the invention. More specifically, catalyst M containing ultra-stable Y zeolite, alumina and silica-alumina gel is significantly more active than catalyst K which contains no silica-alumina gel or catalyst L which contains no alumina. A comparison of catalyst M with catalyst N shows that there is a significant catalytic activity decrease when the ultra-stable Y zeolite of this invention is replaced with Y-type faujasite zeolite.

EXAMPLE 11

Steamed catalysts K, L, M and N which were tested for MAT conversion were also evaluated for cracking performance in a full cycle cracking operation. The unit was a circulating fluidized catalytic cracking unit with regenerator, reactor, and stripper vessels. It was operated in a once through fashion with no recycle oil mixed with the fresh feed. Temperatures in the reactor and regenerator were 925° F. and 1105° F., respectively. The feedstock employed is described above in Table IV. The unit was operated at a constant catalyst to oil ratio of 4.0, atmospheric pressure and a constant unit feed rate of 10 grams per minute. The results given below in Table VII show that the catalyst of this invention gives superior performance as regards conversion, naphtha yield, and product octane.

TABLE VII

COMPARISON OF CATALYST YIELDS AND OCTANES

| Catalyst | K | L | M | N |
|---|---|---|---|---|
| Composition, Wt. % | | | | |
| Ultra-stable Y zeolite | 20 | 20 | 20 | 20[1] |
| Al$_2$O$_3$ | 80 | 0 | 20 | 20 |
| SiO$_2$—Al$_2$O$_3$ Gel | 0 | 80 | 60 | 60 |
| Conversion, Vol. % 430° F. | 53 | 50 | 64 | 35 |
| Yields and Qualities | | | | |
| Coke, Wt. % | 3.3 | 2.4 | 2.3 | 1.5 |
| C$_3$ Dry Gas, Wt. % | 3.8 | 3.4 | 4.8 | 2.3 |
| Total C$_4$, Vol. % | 8.1 | 7.8 | 11.5 | 5.8 |
| C$_5$/430° F. Naphtha, Vol. % | 48 | 45 | 57 | 34 |
| RONC (2) | 93.1 | 92.7 | 92.7 | 91.8 |
| MONC (3) | 78.9 | 78.9 | 80.1 | 79.4 |
| $\frac{\text{RONC} + \text{MONC}}{2}$ | 86.0 | 85.8 | 86.4 | 85.6 |

(1) Zeolite is Y-type faujasite which is not ultra-stable Y zeolite as defined herein.
(2) Research Octane Number Clear
(3) Motor Octane Number Clear

What is claimed is:

1. A process for the catalytic cracking of a hydrocarbon feedstock which comprises contacting said feedstock under catalytic cracking conditions with a cracking catalyst composition comprising discrete particles of ultra-stable Y zeolite and discrete particles of alumina, which particles are dispersed in a porous oxide matrix to produce a catalyst containing 5-40 wt.% ultra-stable Y zeolite, 5-40 wt.% alumina and 40-90 wt.% of porous oxide matrix.

2. The process of claim 1 wherein said porous oxide matrix comprises silica-alumina gel.

3. The process of claim 2 wherein said ultra-stable Y zeolite contains less than 1 wt.% Na$_2$O.

4. The process of claim 3 wherein said ultra-stable Y zeolite contains less than 1% rare earth metal ions and has a unit cell size less than 24.40 A.

5. The process of claim 4 wherein said catalyst comprises 10-30 wt.% ultra-stable Y zeolite, 10-30 wt.% alumina and 50-80 wt.% silica-alumina gel.

6. A process for the catalytic cracking of a hydrocarbon feedstock which comprises contacting said feedstock under catalytic cracking conditions with a cracking catalyst composition comprising discrete particles of ultra-stable Y zeolite containing less than 1 wt.% Na$_2$O and discrete particles of alumina, which particles are dispersed in silica-alumina gel to produce a catalyst containing 5-40 wt.% ultra-stable Y zeolite, 5-40 wt.% alumina and 40-90 wt.% silica-alumina gel.

7. The process of claim 6 wherein the temperature at which said feedstock is catalytically cracked ranges between about 850° to 1050° F.

8. The process of claim 7 wherein the pressure at which said feedstock is catalytically cracked ranges between 0 and 50 psig.

9. The process of claim 8 wherein the feed rate of said feedstock ranges between 1 to 200 W/Hr/W.

10. The process of claim 9 wherein said catalyst is regenerated at a temperature ranging between 1100° and 1500° F.

11. The process of claim 9 wherein said catalyst is regenerated at a temperature ranging between 1175° and 1350° F.

* * * * *